(12) United States Patent  (10) Patent No.: US 8,403,219 B2
Narendra et al.  (45) Date of Patent: *Mar. 26, 2013

(54) APPARATUS WITH SMARTCARD CIRCUITRY POWERED BY A MOBILE DEVICE

(71) Applicants: Siva G. Narendra, Portland, OR (US);
Thomas N. Spitzer, Portland, OR (US);
Prabhakar Tadepalli, Bangalore (IN)

(72) Inventors: Siva G. Narendra, Portland, OR (US);
Thomas N. Spitzer, Portland, OR (US);
Prabhakar Tadepalli, Bangalore (IN)

(73) Assignee: Tyfone, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/651,365

(22) Filed: Oct. 12, 2012

(65) Prior Publication Data

US 2013/0037611 A1  Feb. 14, 2013

Related U.S. Application Data

(63) Continuation of application No. 13/304,663, filed on Nov. 27, 2011, which is a continuation of application No. 13/114,434, filed on May 24, 2011, now Pat. No. 8,091,786, which is a continuation of application No. 12/941,410, filed on Nov. 8, 2010, now Pat. No. 7,954,715, which is a continuation of application No. 12/539,369, filed on Aug. 11, 2009, now Pat. No. 7,828,214, which is a continuation of application No. 11/063,291, filed on Feb. 22, 2005, now Pat. No. 7,581,678.

(51) Int. Cl.
*G06K 7/08* (2006.01)

(52) U.S. Cl. .......................... 235/451; 235/487; 235/380

(58) Field of Classification Search .................. 235/380, 235/375, 382, 492, 487, 493, 451, 379, 472.01, 235/472.02, 472.03
See application file for complete search history.

(56) References Cited

U.S. PATENT DOCUMENTS 8,091,786 B2 *  1/2012  Narendra et al. ............. 235/451

* cited by examiner

*Primary Examiner* — Karl D Frech
(74) *Attorney, Agent, or Firm* — Dana LeMoine; LeMoine Patent Services, PLLC

(57) ABSTRACT

An electronic transaction card communicates with an add-on slot of an intelligent electronic device. The add-on slot may be a memory card slot. The intelligent electronic device may be a mobile phone or other device with or without network connectivity. The electronic transaction card may have magnetic field producing circuitry compatible with magnetic card readers, smartcard circuitry, other point-of-sale interfaces, or any combination thereof.

20 Claims, 16 Drawing Sheets

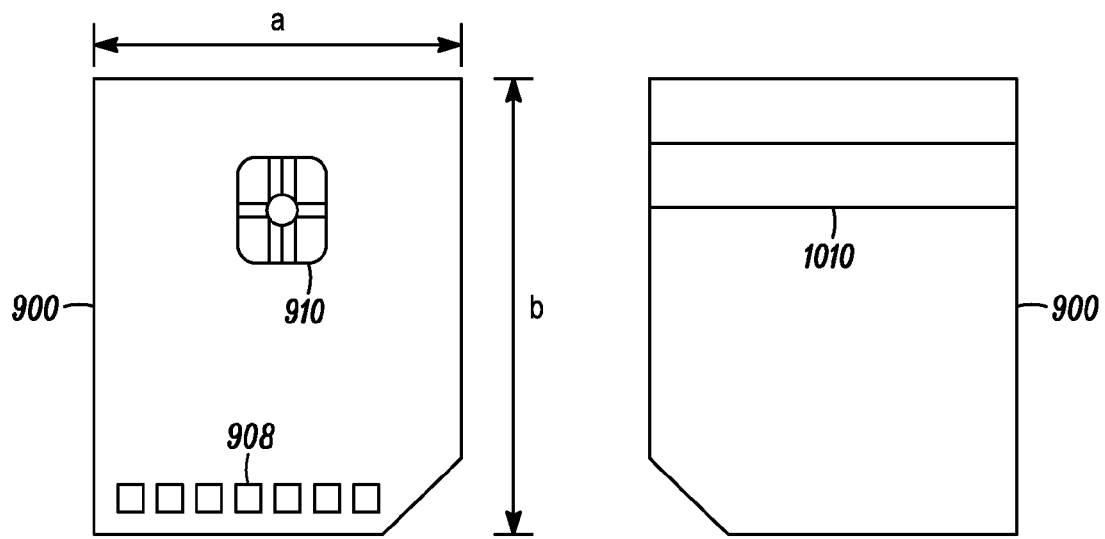
*FIG. 9*  *FIG. 10*
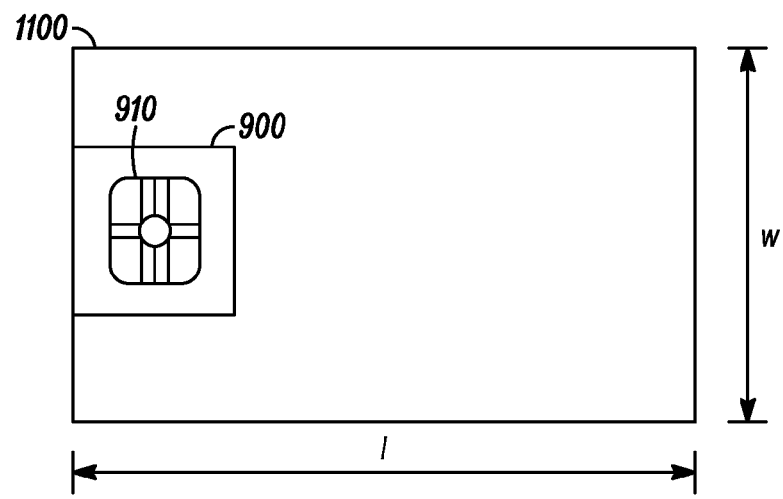
*FIG. 11*

APPARATUS WITH SMARTCARD CIRCUITRY POWERED BY A MOBILE DEVICE

FIELD

The present invention relates generally to electronic devices, and more specifically to electronic devices that may perform transactions.

BACKGROUND

Magnetic cards have many purposes. Examples include credit cards, debit cards, stored value cards, identification cards, access entry cards, and the like. Many of these cards have information stored in a magnetic stripe in a static manner. For example, a credit card may have a credit card number, a cardholder's name, and an issuing bank's name statically encoded in a magnetic strip. Likewise, an identification card or access entry card may have statically encoded information that identifies an individual or allows access to a controlled access area. When the card is swiped through a magnetic card reader, the information is transferred to the magnetic card reader to perform a transaction, such as a financial transaction or identification transaction.

BRIEF DESCRIPTION OF THE DRAWINGS

FIGS. 9 and 10 show an electronic transaction card having a smartcard interface;

FIG. 11 shows an adapter in combination with an electronic transaction card;

DESCRIPTION OF EMBODIMENTS

Figure 1:
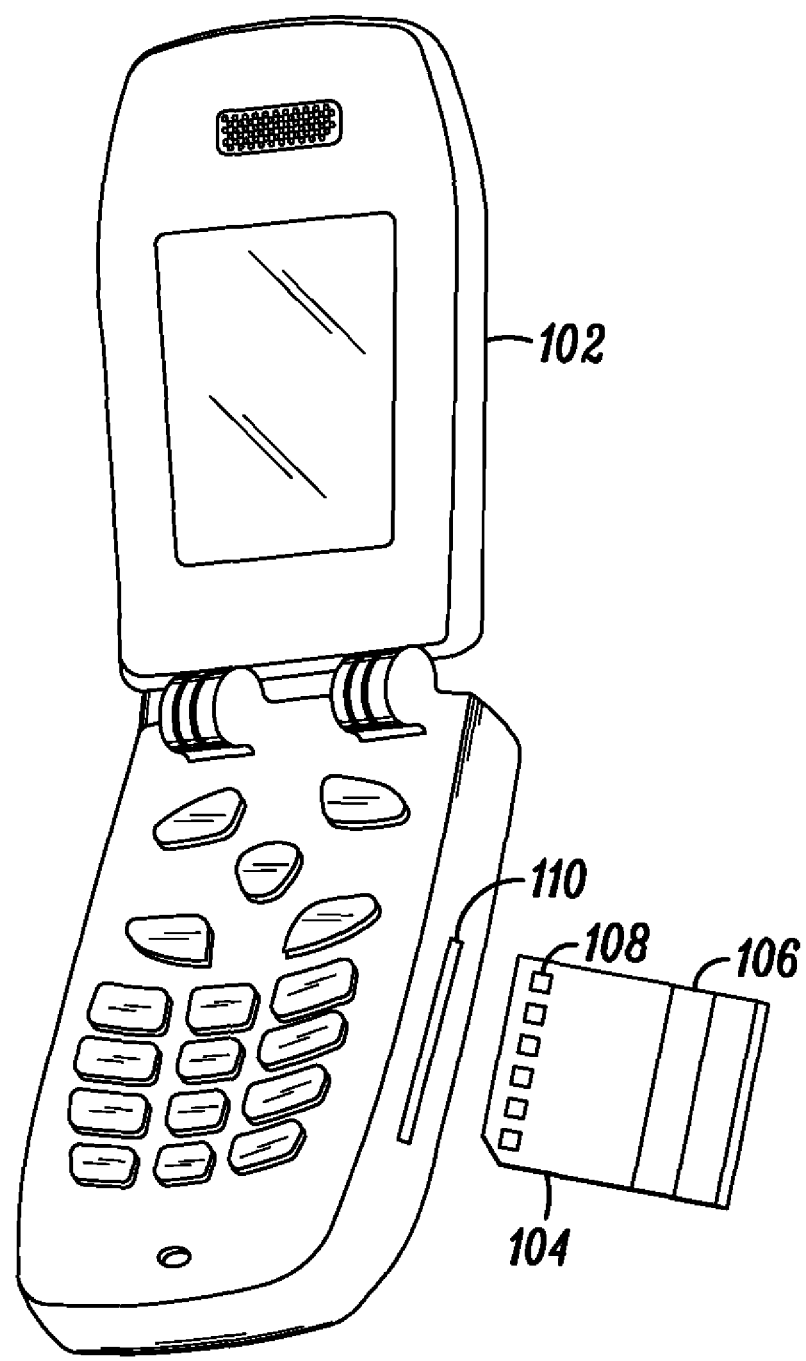
FIGS. 1, 2A, and 2B show intelligent electronic devices and electronic transaction cards.

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows an intelligent electronic device and an electronic transaction card. Intelligent electronic device 102 is shown as a mobile phone in FIG. 1, but this is not a limitation of the present invention. For example, intelligent electronic device 102 may be a personal digital assistant (PDA), a smartphone, a mobile phone, a handheld computer, or any other device capable of operating as described herein.

Intelligent electronic device 102 includes add-on slot 110. Add-on slot 110 is a slot capable of accepting electronic transaction card 104. For example, add-on slot 110 may have physical dimensions compatible with electronic transaction card 104, and may have a communications interface that operates using a protocol compatible with electronic transaction card 104. In some embodiments, electronic transaction card 104 includes an identification number that provides a relationship to intelligent electronic device 102. For example, electronic transaction card 104 may include an ID number that provides a unique pairing relationship or a non-unique pairing relationship between electronic transaction card 104 and intelligent electronic device 102.

In some embodiments of the present invention, add-on slot 110 is a memory card slot designed to accept and communicate with memory cards. As used herein, the term "memory card slot" refers to any add-on slot capable of accepting a card having memory accessible by an intelligent electronic device such as that shown in FIG. 1. For example, a memory card slot may be a proprietary card slot designed to accept memory cards that adhere to a proprietary communications protocol. Also for example, a memory card slot may be compatible with an industry standard communications protocol, or may be compatible with a widely accepted communications protocol that is not necessarily formally documented as an industry standard. Examples include slots that are compatible with the Multimedia Memory Card (MMC) protocol, Memory Stick DUO protocol, secure digital (SD) protocol, and Smart Media protocol. The foregoing list is meant to be exemplary, and not exhaustive. Add-on slot 110 may be compatible with many memory card slot protocols other than those explicitly listed above without departing from the scope of the invention.

Electronic transaction card 104 includes electrical contacts 108 and stripe 106. Electrical contacts 108 are contacts that provide a communications interface to communicate with add-on slot 110. For example, electrical contacts 108 may provide connectivity compliant with a communications protocol for memory cards.

Stripe 106 represents an area on an external face of electronic transaction card 104 at which one ore more time-varying magnetic fields emanate. For example, one or more time-varying magnetic fields may emanate from the location of stripe 106 to communicate with a magnetic card reader. In some embodiments, the time-varying magnetic field may emulate the time-varying magnetic field produced when a typical magnetic card is swiped through a magnetic card reader. For example, a time-varying magnetic field produced at stripe 106 may emulate the swipe of a credit card, a debit card, or any other card having a magnetic stripe compatible with a magnetic card reader.

In some embodiments of the present invention, stripe 106 may be a visible stripe on electronic transaction card 104. When stripe 106 is visible, it may be used to indicate the location at which the time-varying magnetic field will emanate. In other embodiments of the present invention, stripe 106 may not be visible. For example, circuitry may be included within electronic transaction card 106 to produce the time-varying magnetic field and no visible indication may be present on an external face of electronic transaction card 104.

As used herein, the term "stripe" generally refers to a location on an electronic transaction card, whether a visible stripe exists or not. In this description, the term "stripe" may also be used to refer to a visible marking on a face of an electronic transaction card. Further, a "stripe" may include the functionality provided by one or more time-varying magnetic fields that emanate from the card. For example, the term "stripe" may refer to multiple magnetic tracks, or multiple "stripes," or emulation thereof.

Stripes, as described herein, may be compatible with one or more standards. A stripe may be compatible with a standard by being in compliance with the standard or by being partially in compliance with the standard. For example, stripe 106 may be compatible with an American National Standards Institute (ANSI) magnetic stripe standard, or an International Organization for Standardization (ISO) magnetic stripe standard. In addition, in some embodiments, a stripe may emulate more than one magnetic track, and the emulated tracks may or may not be offset from the location specified in a standard. For example, one or more wires may be utilized to generate time-varying magnetic fields compatible with a standard, and the wires may be located at or near stripe 106 in a location different than the magnetic track offset described in an associated standard.

As used herein, the term "transaction" refers to any beneficial use of an electronic transaction card. For example, any time stripe 106 emits a time-varying magnetic field to be read by a magnetic card reader or a hybrid smartcard reader, a transaction may take place. Transactions may include financial transactions, access control transactions, or any other type of transaction involving any of the electronic transaction card embodiments described herein. Further, as described in more detail below, in some embodiments of the present invention, transactions may utilize smartcard interfaces on electronic transaction cards in addition to, or in lieu of, stripes that emit time-varying magnetic fields.

In operation, intelligent electronic device 102 may program electronic transaction card 104 for use in a transaction involving stripe 106. For example, intelligent electronic device 102 may program electronic transaction card 104 to operate as a credit card, a debit card, or the like. Electronic transaction card 104 may then be used with a magnetic stripe or smartcard based merchant point-of-sale terminal to effect a transaction. Also for example, intelligent electronic device 102 may program electronic transaction card 104 to operate in any other environment where stripe 106 may be beneficially utilized with a magnetic card reader.

Figure 2A:
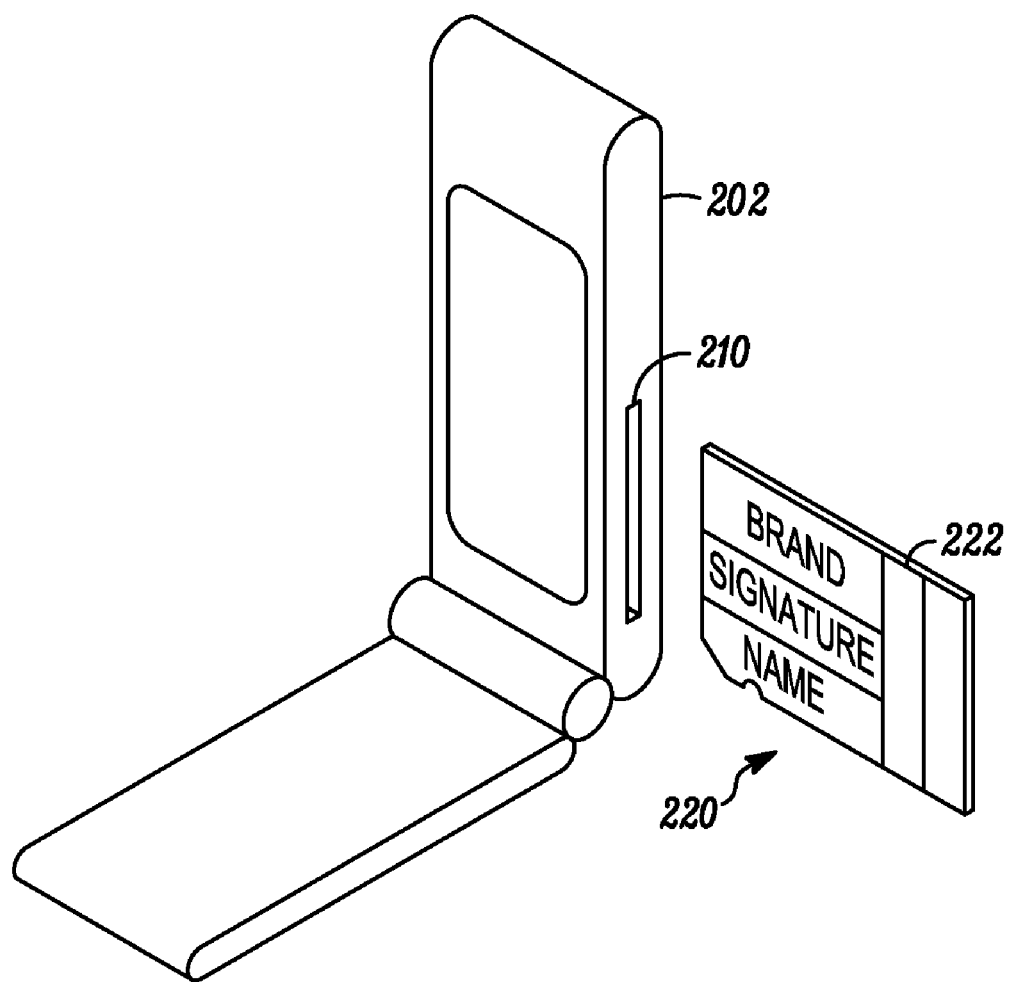

FIG. 2A shows intelligent electronic device 202 and electronic transaction card 220. Intelligent electronic device 202 includes add-on slot 210 to receive electronic transaction card 220. Intelligent electronic device 202 is shown having add-on slot on one side, but this is not a limitation of the present invention. For example, add-on slot 210 may be located on top, bottom, or any other surface of intelligent electronic device 202. Also for example, an add-on slot may be created by a clamshell design when the shell is closed. In these embodiments, each side of the clamshell may incorporate a portion of the add-on slot such that the add-on slot is "open" when the clamshell is open.

Electronic transaction card 220 may have any form factor compliant with add-on slot 210. Electronic transaction card 220 is shown having a form factor with an aspect ratio different from that of electronic transaction card 104 (FIG. 1). Electronic transaction card 220 includes stripe 222 and may have electrical contacts to interface with add-on slot 210. The electrical contacts may be on the back side of electronic transaction card 220, recessed on an edge of electronic transaction card 220, or on the front side of electronic transaction card 220. In some embodiments, electronic transaction card 220 includes a "contactless" interface to add-on slot 210. For example, electronic transaction card 220 may include an interface to add-on slot 210 that communicates using electric or magnetic fields, infrared (IR) light, or any other suitable communications mechanism.

Electronic transaction card 220 may have an area for imprinting. For example, as shown in FIG. 2A, electronic transaction card 220 may have space for imprinting a brand (for a bank or otherwise), and a cardholder's name. Further, electronic transaction card 220 may include space for a cardholder's signature. Electronic transaction card 220 may include any other information, coded or unencoded, visible or nonvisible, without departing from the scope of the present invention.

Intelligent electronic device 202 may include a mechanism to allow intelligent electronic device 202 to communicate with a wired or wireless network. For example, intelligent electronic device 202 may include circuitry to communicate with a cellular phone network. Note that in these embodiments, intelligent electronic device 202 may or may not be a phone. For example, intelligent electronic device 202 may be a cellular telephone with an add-on slot for use with an electronic transaction card. Also for example, intelligent electronic device may be a non-telephonic device that has cellular network connectivity. Examples include personal digital assistants, and handheld devices dedicated to the use of electronic transaction cards. Further, intelligent electronic device 202 may be a non-telephonic device having wired or wireless connectivity to a network other than a cellular network, and in some embodiments, intelligent electronic device 202 may be a device without network connectivity. Examples include, but are not limited to: Blackberry devices available from Research in Motion (RIM), music players such as MP3 players, cameras, and the like.

In operation, intelligent electronic device 202 may program electronic transaction card to perform a transaction. In some embodiments, communications over a network may play a role in the transaction. For example, intelligent electronic device 202 may receive authorization for the transaction over a network. Also for example, intelligent electronic device 202 may program electronic transaction card 220 to perform a transaction, and then report the transaction to an entity using the network.

Electronic transaction card 220 may be utilized in financial transactions. For example, electronic transaction card 220 may be programmed to operate as a credit card or a stored value card. In these embodiments, electronic transaction card 220 may be programmed to emit one or more time-varying magnetic fields to emulate the swiping of a credit card or stored value card. In some of these embodiments, electronic transaction card 220 may use one number repeatedly, or may use a different number for each transaction. For example, electronic transaction card 220 may be programmed to have one number, similar to how a credit card uses the same number repeatedly. Also for example, electronic transaction card 220 may be programmed to use a different number for each transaction. These numbers are referred to herein as "single transaction account numbers" or "STANs."

Single transaction account numbers may be generated by the card issuer or locally by either an intelligent electronic device or an electronic transaction card. Generation of STANs may be accomplished in any of several ways. For example, when an electronic transaction card is issued, the cardholder may receive several pre-assigned single-use transaction numbers. The numbers may also have a pre-specified sequence. In some embodiments, this sequence may be known only to the issuing bank and the cardholder's intelligent electronic device and/or electronic transaction card. A card issuing bank may authorize payments based on the expected sequence of account numbers, and if out-of-sequence account numbers are used, then the issuing bank may consider that transaction as a potentially fraudulent transaction. The issuing bank may also use this feature to track the merchant involved in the potentially fraudulent transaction.

According to another example, a pre-assigned sequence of STANs may be reset to the original starting number on the list depending on user input or other triggers. In addition, the list of numbers may be periodically downloaded via a cellular phone network or other network connectivity.

Figure 2B:
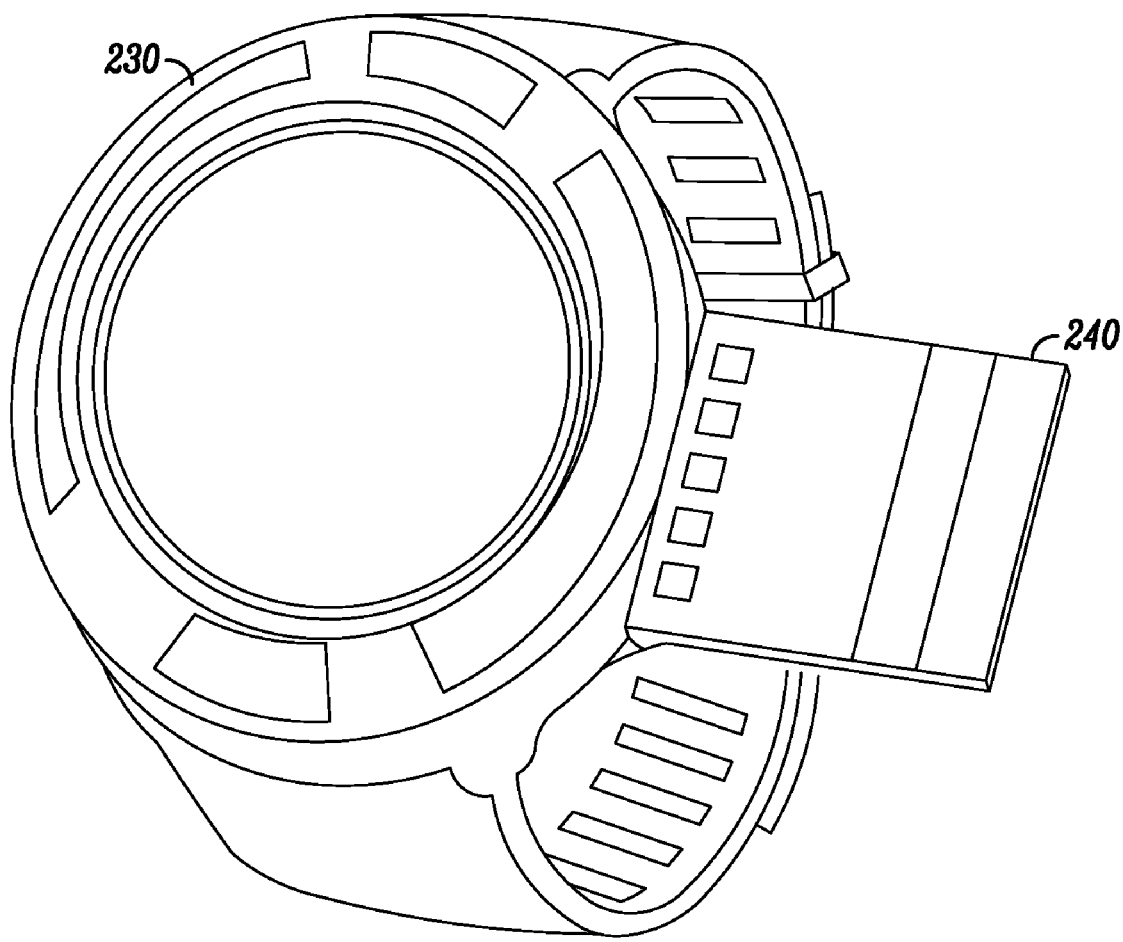

FIG. 2B shows intelligent electronic device 230 and electronic transaction card 240. Intelligent electronic device 230 is an example of a "wearable" device that is capable of communicating with an electronic transaction card. For example, intelligent electronic device 230 is shown having the form factor of a wristwatch. Some embodiments of the present invention may have other wearable form factors. For example, a wearable intelligent electronic device may be worn in such a manner that it contacts human skin, or it may be worn on clothing. Any wearable intelligent electronic device may be employed without departing from the scope of the present invention. Further, intelligent electronic device 230 may have any of the capabilities described herein.

Intelligent electronic device 230 may include an add-on slot to accept electronic transaction card 230. The add-on slot may be any of the add-on slot embodiments described herein. Electronic transaction card 240 may be any electronic transaction card. For example, electronic transaction card 240 may be any electronic transaction card embodiment described herein.

Figure 3:
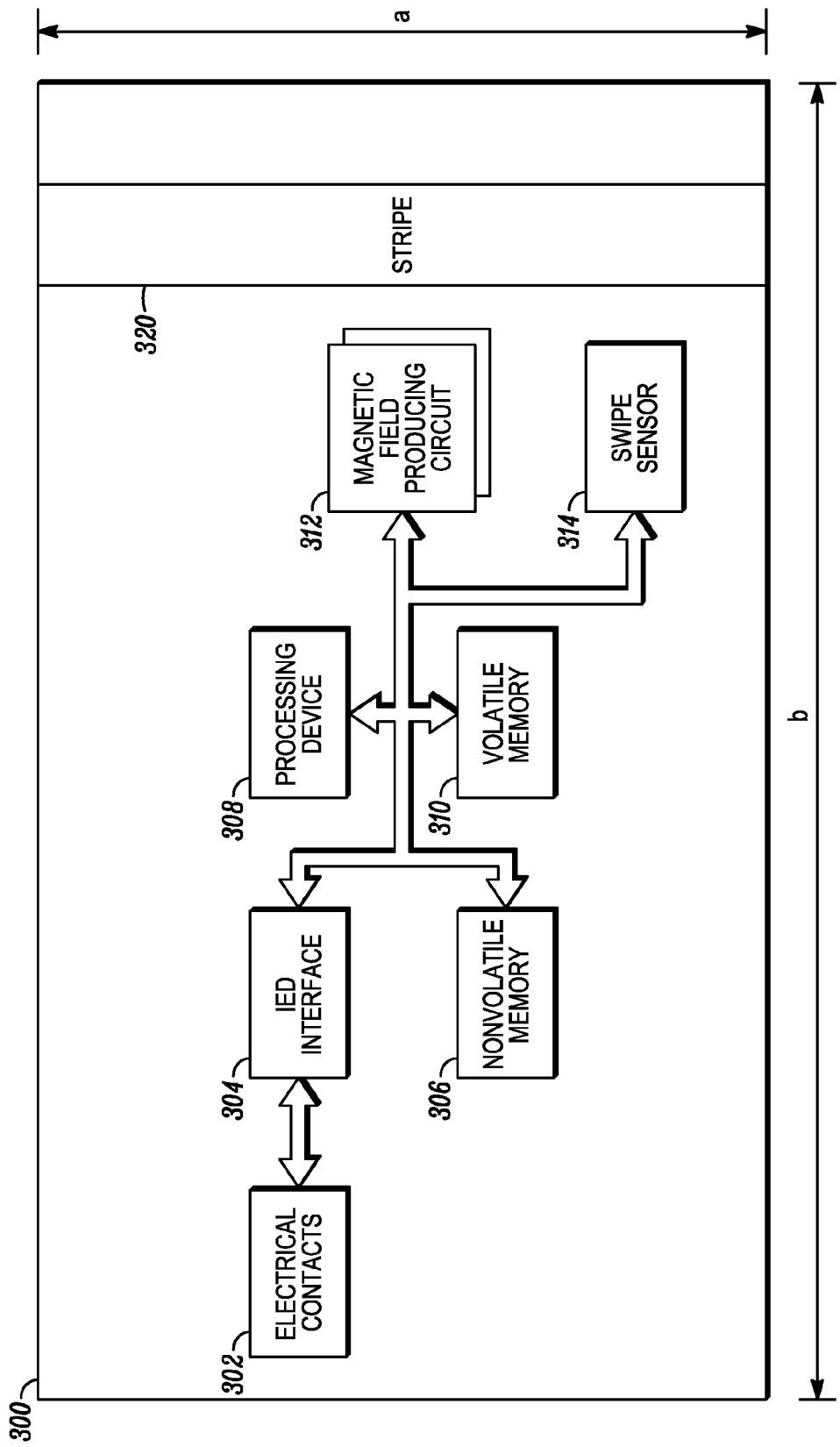
FIG. 3 shows a block diagram of an electronic transaction card.

FIG. 3 shows a block diagram of an electronic transaction card. Electronic transaction card 300 is an electronic transaction card capable of communicating with an intelligent electronic device, and capable of communicating with a magnetic card reader. For example, electronic transaction card 300 may be electronic transaction card 104 (FIG. 1) or electronic transaction card 220 (FIG. 2A).

Electronic transaction card 300 includes electrical contacts 302, intelligent electronic device (IED) interface 304, nonvolatile memory 306, processing device 308, volatile memory 310, magnetic field producing circuits 312, swipe sensor 314, and stripe 320.

Electrical contacts 302 correspond to electrical contacts 108 (FIG. 1). IED interface 304 is coupled to electrical contacts 302 to provide a communications interface between electronic transaction card 300 and an intelligent electronic device. For example, IED interface 304 may be an interface compatible with an add-on slot such as add-on slot 110 (FIG. 1) or add-on slot 210 (FIG. 2A).

Magnetic field producing circuit 312 includes one or more circuits to produce time-varying magnetic fields at or near the location of stripe 320. For example, one or more current carrying conductors may be excited to produce a magnetic field, and the current may be varied in amplitude and reversed in polarity to cause the magnetic field to be time-varying. In some embodiments, the number of magnetic field producing circuits corresponds to the number of tracks being emulated for stripe 320. For example, stripe 320 may emulate two, three, four, or more magnetic tracks on a magnetic card such as a credit card. In these embodiments, electronic transaction card 300 may include two, three, four, or more magnetic field producing circuits 312. Magnetic field producing circuits 312 may also include circuits to allow control of the time-varying magnetic field. For example, magnetic field producing circuits 312 may include voltage drivers, current drivers, registers to hold digital data, sequential circuits to translate the digital data to magnetic fields, and the like.

Swipe sensor 314 senses when electronic transaction card 300 has been swiped in a magnetic card reader, and provides a swipe indication to processing device 308. The swipe sensor may be a mechanical switch, an electronic switch, or any other type of suitable switch. For example, a mechanical switch may get pressed when electronic transaction card 300 is swiped. Also for example, an electrical sensor may include two or more contacts (not shown) that get shorted when swiped past a metal head within a card reader. Further, a Hall effect sensor or light-based sensor may be utilized. The present invention is not limited by the type of swipe sensor utilized. In some embodiments, swipe sensor 314 is omitted.

Processing device 308 represents a processor capable of communicating with the other blocks shown in electronic transaction card 300. For example, processing device 308 may be a microprocessor, a digital signal processor (DSP), a microcontroller, or the like. Further, processing device 308 may be formed from state machines or other sequential logic. In operation, processing device 308 may read instructions from volatile memory 310 and/or nonvolatile memory 306 and perform actions in response thereto. For example, processing device 308 may execute program instructions that influence communications between electronic transaction card 300 and an intelligent electronic device, or between electronic transaction card 300 and a magnetic card reader.

Volatile memory 310 represents memory that may lose its state when power is removed from electronic transaction card 300. For example, volatile memory 310 may be static random access memory (SRAM). Volatile memory 308 may be utilized by processing device 308 when executing programs. For example, a program may be copied into volatile memory 308 prior to execution. Also for example, processing device 308 may use volatile memory 308 to store data during the execution of a program.

Nonvolatile memory 306 represents memory that does not lose its state when power is removed from electronic transaction card 300. Nonvolatile memory 306 may be any suitable type of memory such as Flash memory with floating gate transistor memory cells. Examples include NOR Flash memory, NAND Flash memory, and multibit/cell Flash memory.

Nonvolatile memory 306 may hold program instructions that are executable by processing device 308. For example, prior to being sold, a manufacturer or distributor may program nonvolatile memory 306 with program information to influence the operation of electronic transaction card 300.

Also for example, an intelligent electronic device may provide program information to electronic transaction card 300 through IED interface 304.

Nonvolatile memory 306 may also hold program instructions that are executable by a processing device other than processing device 308. For example, a manufacturer, distributor, reseller, or other participant in the chain of commerce may program nonvolatile memory 306 with program information to be transferred to an intelligent electronic device. Information to be transferred may include device drivers, application software, or the like.

Electronic transaction card 300 may include one or more power sources (not shown). For example, electronic transaction card 300 may include a battery or a capacitor such as a supercapacitor. In some embodiments, a rechargeable battery may be included. The rechargeable battery may accept a charge from an add-on slot in an intelligent electronic device. In some embodiments, a capacitor may accept a charge from an intelligent electronic device. The capacitor may provide power to electronic transaction card 300 for enough time to perform a transaction. Further, the capacitor may be sized to ensure that a transaction may only be performed during a limited time period after removing the electronic transaction card from an add-on slot, thereby ensuring that a stolen card may not be used repeatedly without the cardholder's consent. Also in some embodiments, electronic transaction card 300 may be programmed to go dormant if a transaction is not performed within a limited time period after removing the card from an intelligent electronic device.

Electronic transaction card 300 may include one or more integrated circuits. For example, processing device 308 may be on one integrated circuit die, and the memories may be on another integrated circuit die. In some embodiments, all active devices are included on a single integrated circuit die. In some embodiments, various integrated circuit dice are mounted on a common substrate to provide a high level of integration using separate dice. Any amount of circuit integration may be practiced without departing from the scope of the present invention.

Electronic transaction card 300 has dimensions "a" and "b." In some embodiments of the present invention, stripe 320 has a length that is substantially equal to a, and in some embodiments, stripe 320 has a length less than a. Further, in some embodiments, a is less than the stripe length of a standard credit card (approximately three and three eighths inches), and in some embodiments, a is much less than the stripe length of a standard credit card. For example, in some embodiments, a is less than 75% the length of a standard credit card stripe. Further, in some embodiments, a is less than 50% the length of a standard credit card stripe. In still further embodiments, a is less than 25% the length of a standard credit card stripe.

In some embodiments, dimensions a and b are substantially equal to the dimensions of a memory card. For example, dimensions a and b may conform to the dimensions of an MMC memory card, a Memory Stick PRO DUO memory card, or other memory card. Further, in some embodiments, electronic transaction card 300 has a thickness compatible with a magnetic card reader.

Figure 4:
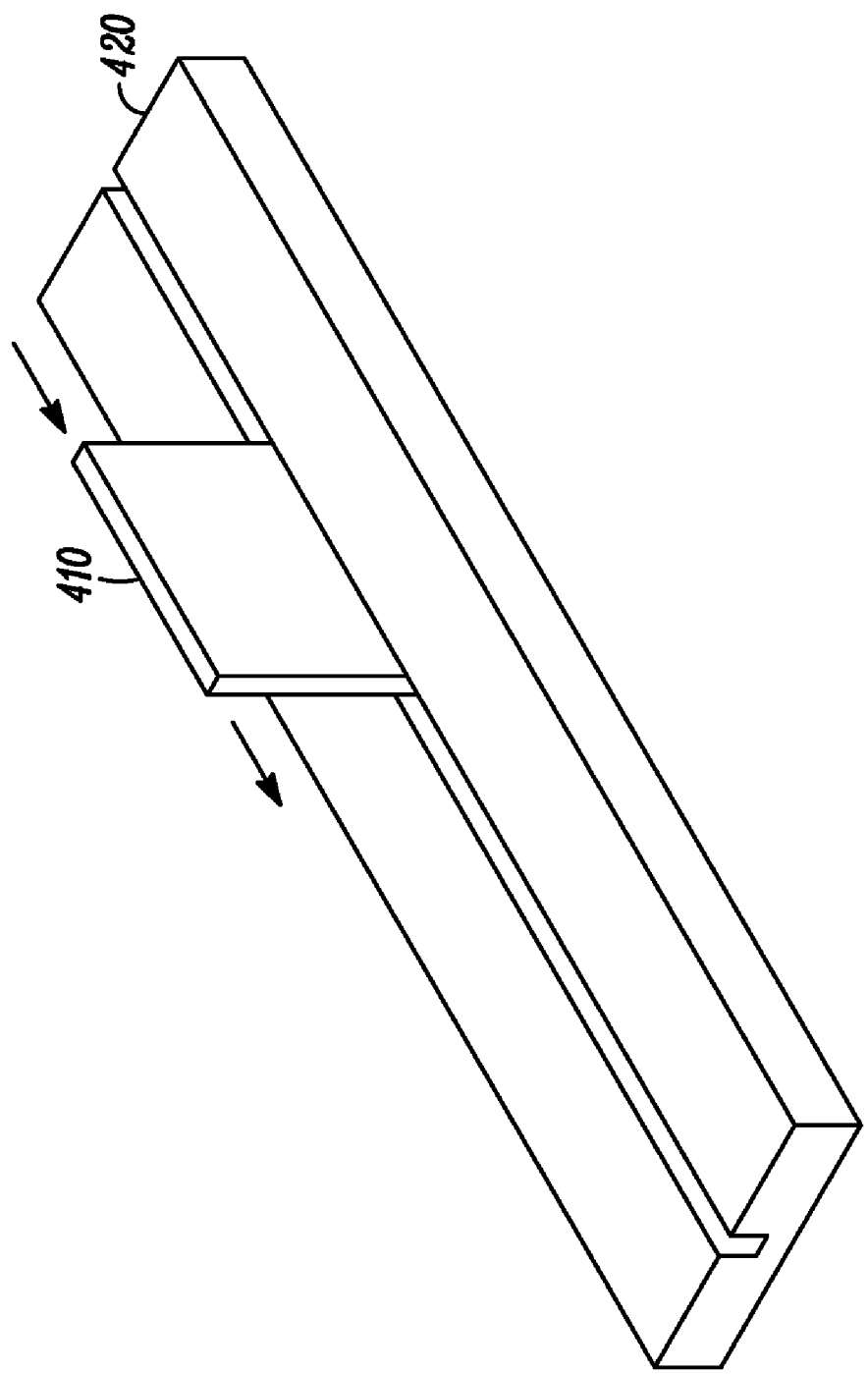
FIG. 4 shows an electronic transaction card in a magnetic card reader.

FIG. 4 shows an electronic transaction card and a card reader. Electronic transaction card 410 is a card having a stripe compatible with a magnetic card reader. For example, electronic transaction card 410 may be electronic transaction card 104 (FIG. 1), electronic transaction card 220 (FIG. 2A), electronic transaction card 300 (FIG. 3), or any other electronic transaction card described herein. Magnetic card reader 420 is a card reader compatible with magnetic cards. For example, magnetic card reader 420 may operate as part of a merchant point-of-sale terminal, an access control device, or the like. When a magnetic card is swiped through magnetic card reader 420, one or more time-varying magnetic fields are produced relative to the location of a magnetic read head (not shown) in magnetic card reader 420.

In the operation depicted in FIG. 4, electronic transaction card 410 is swiped through magnetic card reader 420. During the swiping operation, electronic transaction card 420 produces one or more time-varying magnetic fields to emulate the swiping of a magnetic card. For example, a swipe sensor within electronic transaction card 410 may detect the swiping action depicted in FIG. 4, and a magnetic field producing circuit may generate one or more time-varying magnetic fields as electronic transaction card 410 passes by a magnetic read head in magnetic card reader 420.

Figure 5:
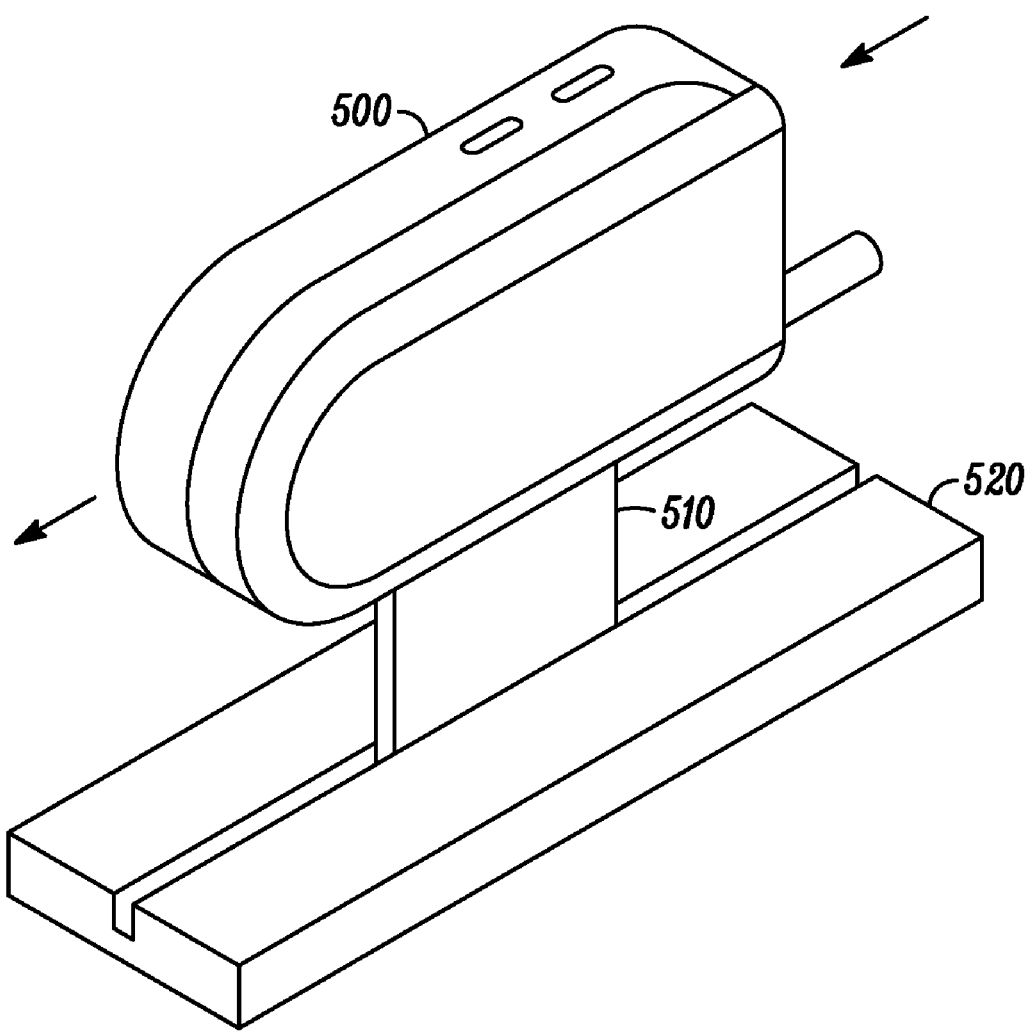
FIG. 5 shows an intelligent electronic device and card in a card reader.

FIG. 5 shows an intelligent electronic device, an electronic transaction card, and a magnetic card reader. Electronic transaction card 510 is shown being swiped through magnetic card reader 520 while attached to intelligent electronic device 500. The operation depicted in FIG. 5 represents a transaction occurring while electronic transaction card 510 is coupled to an add-on slot of intelligent electronic device 500.

Figure 6:
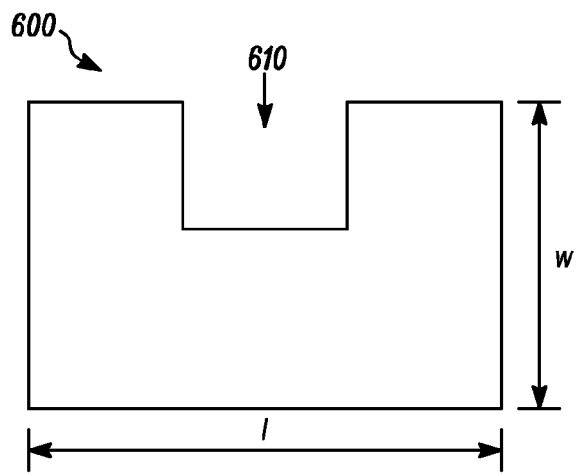
FIGS. 6-8 show adapters for use with electronic transaction cards.

FIG. 6 shows an adapter for use with an electronic transaction card. Adapter 600 includes a body portion having dimensions "w" and "l", and a receiving portion shown at 610. Adapter 600 is useful to receive an electronic transaction card at receiving portion 610 to provide a larger card having the functionality of an electronic transaction card. For example, in some embodiments of the present invention, dimensions w and l are compatible with swallow-type magnetic card readers, and a combination of adapter 600 an electronic transaction card may be compatible with such readers.

Receiving portion 610 may include an interface compatible with a connector on an electronic transaction card. For example, an electronic transaction card may have an interface that is compatible with both an add-on slot of an electronic transaction device and receiving portion 610 of adapter 600.

Figure 7:
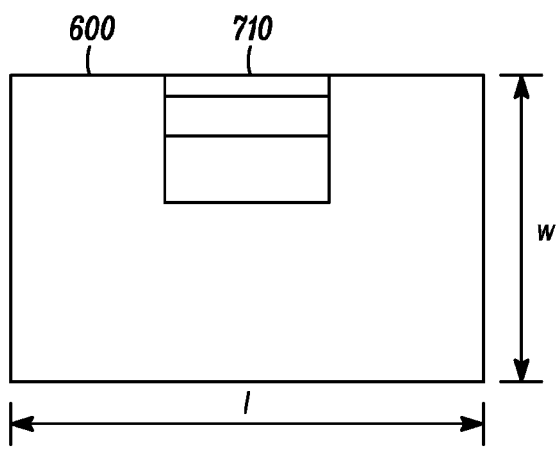

FIG. 7 shows adapter 600 having an electronic transaction card 710 coupled thereto. Electronic transaction card 710 includes a stripe capable of emitting one or more time-varying magnetic fields as described above. The combination of electronic transaction card 710 and adapter 600 allow the functionality of electronic transaction card 710 to be useful in the larger form factor of adapter 600.

In some embodiments, adapter 600 includes active or passive circuitry in support of the operation of electronic transaction card 710. For example, adapter 600 may include electrical contacts, a battery, an integrated circuit, or other circuits. Also for example, adapter 600 may include one or more swipe sensors to provide a swiping indication to electronic transaction card 710.

Figure 8:
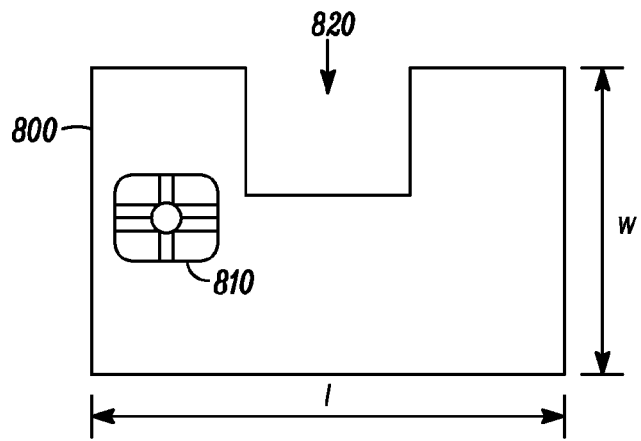

FIG. 8 shows an adapter having a smartcard interface 810. In embodiments represented by FIG. 8, an adapter may be utilized to perform a transaction involving a smartcard reader while utilizing an electronic transaction card. For example, an electronic transaction card may be coupled to adapter 800 at receiving portion 820, and the electronic transaction card may provide data useful for a smartcard transaction.

FIG. 9 shows an electronic transaction card having a smartcard interface. Electronic transaction card 900 includes electrical contacts 908 and 910. Electrical contacts 908 are similar to electrical contacts 108 (FIG. 1). For example, electrical contacts 908 may be compatible with an add-on slot of an intelligent electronic device such as intelligent electronic device 102 (FIG. 1). Electrical contacts 910 are arranged to provide the communications interface to a smartcard reader.

In some embodiments, electronic transaction card 900 includes a smartcard interface as well as a stripe to produce the time-varying magnetic field. For example, as shown in FIG. 10, the backside of electronic transaction card 900 may include stripe 1010. The various electronic transaction cards described herein may include a stripe, a smartcard interface, or a combination thereof.

FIG. 11 shows an adapter in combination with an electronic transaction card. Adapter 1100 is shown having electronic transaction card 900 coupled in a recessed portion on a side having dimension w. In some embodiments, this configuration places electrical contacts 910 at a location expected by smartcard readers.

Figure 12:
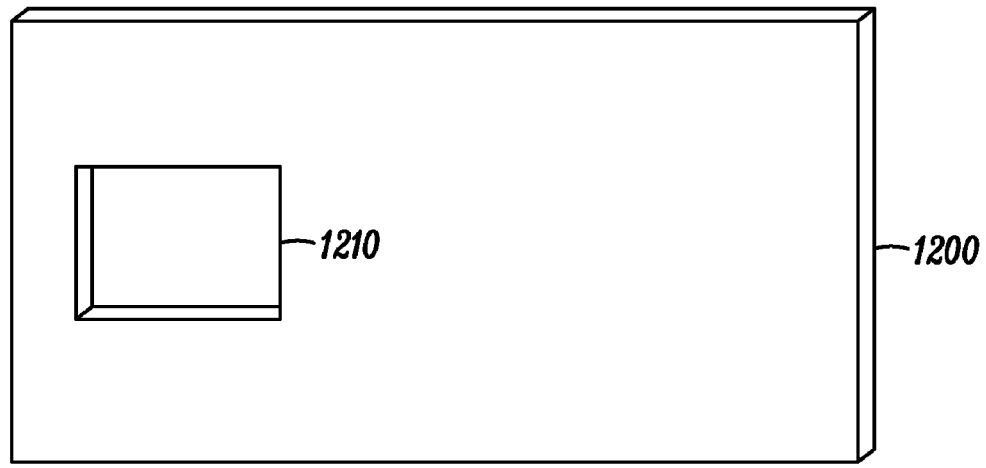
FIG. 12 shows an adapter having an aperture to receive an electronic transaction card.

FIG. 12 shows an adapter having an aperture to receive an electronic transaction card. Adapter 1200 includes aperture 1210 to receive an electronic transaction card. In some embodiments, aperture 1210 passes completely through adapter 1200, and in other embodiments, aperture 1210 is a recessed portion on the face of adapter 1200. Adapter 1200 may receive electronic transaction cards having a stripe, a smartcard interface, or a combination of the two.

Figure 13:
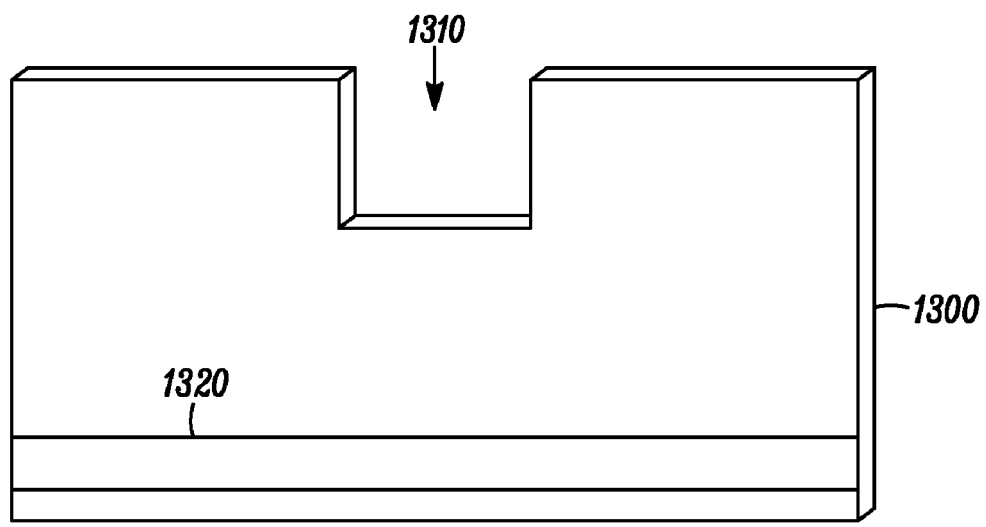
FIG. 13 shows another adapter embodiment.

FIG. 13 shows and adapter having a body portion 1300, a recessed portion 1310, and stripe 1320. Recessed portion 1310 may receive an electronic transaction card as described above with respect to FIGS. 6-7. Further, stripe 1320 may be utilized to communicate with a magnetic card reader. For example, adapter 1300 may include a magnetic field producing circuit such as magnetic field producing circuit 312 (FIG. 3) to produce a time-varying magnetic field. In operation, an electronic transaction card may be coupled to adapter 1300 at recessed portion 1310, and provide transaction information to be used by stripe 1320 for a transaction with a magnetic card reader. In some embodiments, an electronic transaction card having neither a stripe nor a smartcard interface may be coupled to adapter 1300 at recessed portion 1310 to effect a transaction using stripe 1320.

The various adapters shown in the previous figures may have recessed portions, apertures, or stripes anywhere on the adapter without departing from the scope of the present invention. For example, in some embodiments, a recessed portion may be on the side of the adapter having a smaller dimension, and in other embodiments a recessed portion may be on the side of the adapter having a larger dimension. Also for example, in some embodiments, a stripe may be on the side of the adapter having a smaller dimension, and in other embodiments a stripe may be on the side of the adapter having a larger dimension.

Figure 14:
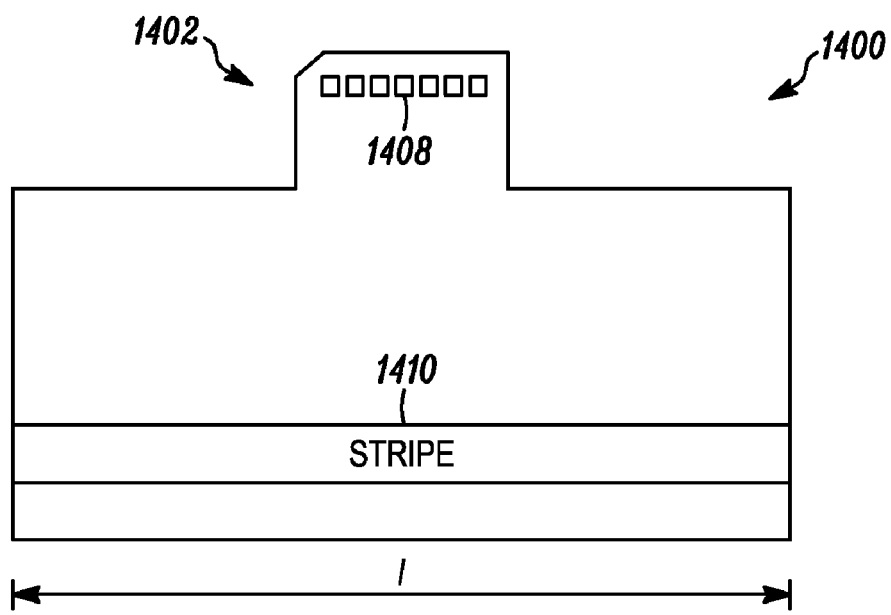
FIG. 14 shows an electronic transaction card.

FIG. 14 shows an electronic transaction card. Electronic transaction card 1400 includes stripe 1410 and add-on slot compatible portion 1402. Add-on slot compatible portion 1402 includes electrical contacts 1408 to communicate with an add-on slot in an intelligent electronic device. For example, add-on slot compatible portion 1402 may be physically and electrically compatible with add-on slot 110 (FIG. 1) or add-on slot 210 (FIG. 2A).

Electronic transaction card 1400 may include any of the circuits, features, or functionality described herein. For example, electronic transaction card 1400 may include magnetic field producing circuits, swipe sensors, processing devices, volatile and nonvolatile memory, various interfaces, and electrical contacts.

Electronic transaction card 1400 is shown having stripe 1410 along an edge having dimension "l." In some embodiments, electronic transaction card 1400 may have stripe 1410 along an edge other than that shown in FIG. 14.

In operation, electronic transaction card 1400 may be left coupled to an electronic transaction device when being swiped through a magnetic card reader, similar to the operation shown in FIG. 5. Further, electronic transaction card 1400 may be removed from an intelligent electronic device prior to being swept through a magnetic card reader, similar to the operation shown in FIG. 4.

Figure 15:
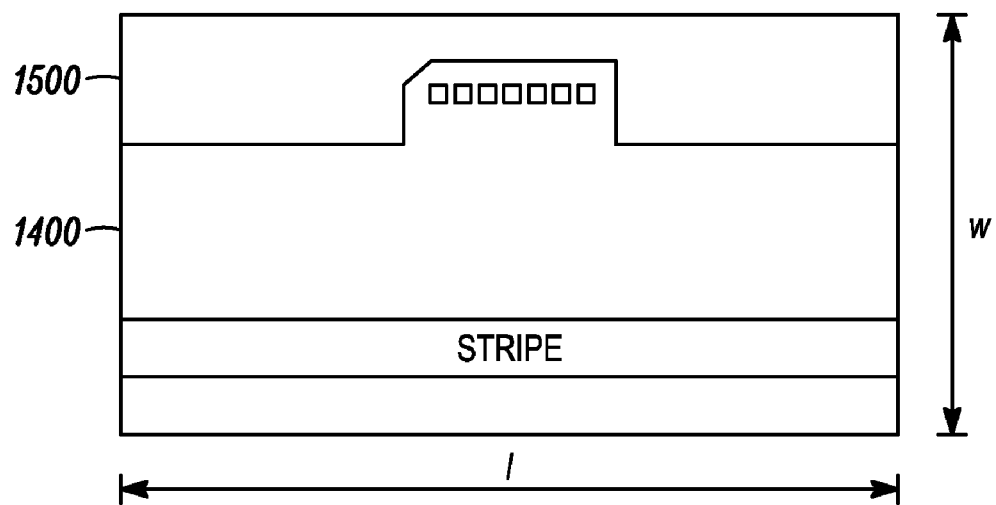
FIG. 15 shows an electronic transaction card and adapter combination.

FIG. 15 shows an electronic transaction card and an adapter in combination. The combination of electronic transaction card 1400 and adapter 1500 form a card having dimensions "w" and "l" as described above with reference to previous figures. The resulting card may be suitable for swallow-type magnetic card readers.

Figure 16:
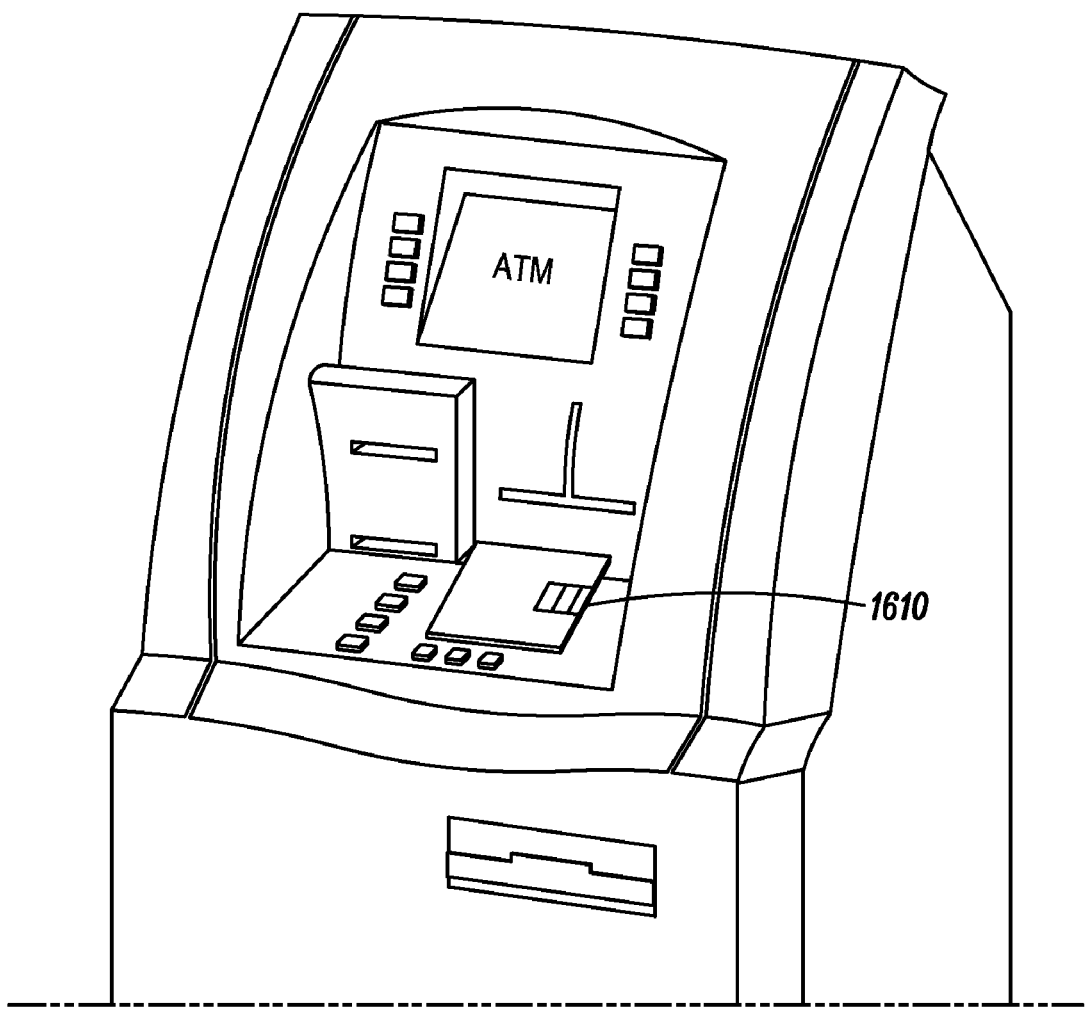
FIG. 16 shows an example swallow-type card reader.

FIG. 16 shows a combination electronic transaction card and adapter 1610 being inserted into a swallow-type magnetic card reader. As shown in FIG. 16, the swallow-type magnetic card reader is part of an automated teller machine (ATM), but this is not a limitation of the present invention. For example, the swallow-type reader may be part of a point-of-sale device, an access entry device, or any other type of device capable of incorporating a swallow-type magnetic card reader.

Figure 17:
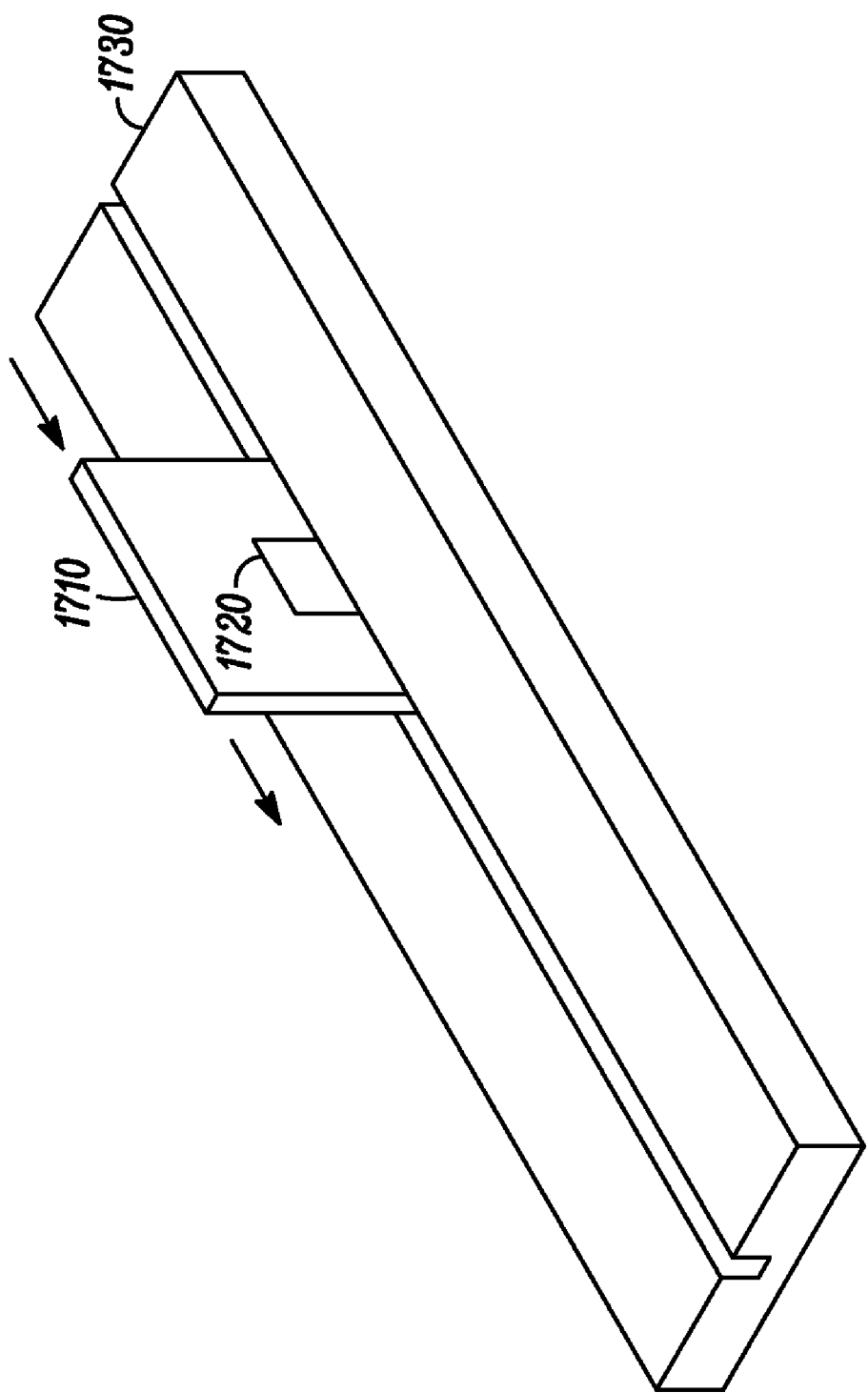
FIG. 17 shows a combination electronic transaction card and adapter being swiped through a magnetic card reader.

FIG. 17 shows a combination electronic transaction card and adapter being swiped through a magnetic card reader. Adapter 1710 and electronic transaction card 1720 are shown being swiped through magnetic card reader 1730. Electronic transaction card 1720 maybe any of the electronic transaction card embodiments described herein. For example, electronic transaction card 1720 may include a stripe, a smartcard interface, or a combination of the two. Although adapter 1710 is shown as an adapter having a recessed portion on one side, the combination adapter/card in FIG. 17 represents any of the adapter/card combinations described herein. For example, adapter 1710 may be any of adapters 600 (FIGS. 6,7), adapter 800 (FIG. 8), adapter 1100 (FIG. 11), adapter 1200 (FIG. 12), adapter 1300 (FIG. 13), or adapter 1500 (FIG. 15).

Figure 18:
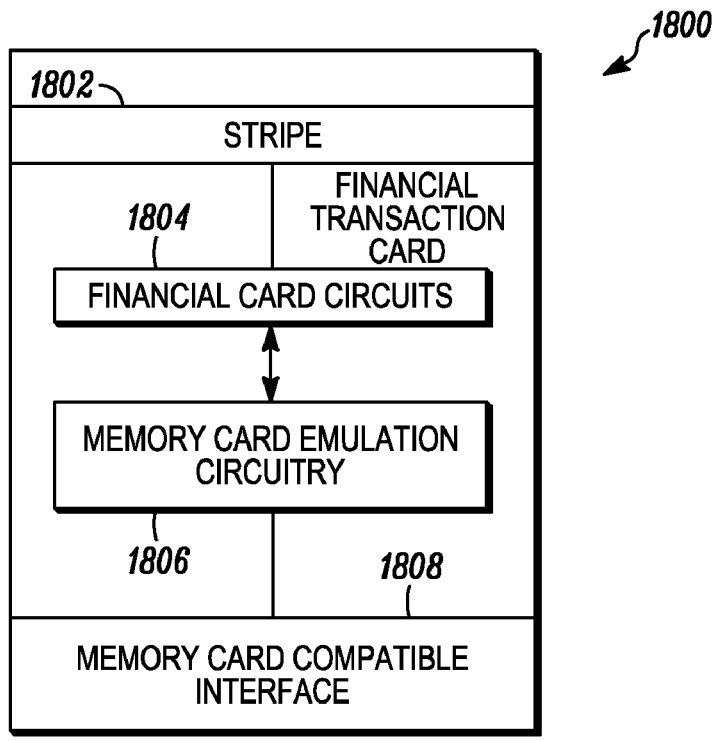
FIG. 18 shows a financial transaction card.

FIG. 18 shows a financial transaction card. Financial transaction card 1800 includes stripe 1802, financial card circuits 1804, memory card emulation circuitry 1806, and memory card compatible interface 1808. Financial transaction card 1800 is an example of a financial card that might be issued by a bank or other financial institution. For example, financial transaction card 1800 might be a debit card, a credit card, a stored value card, or other card issued for the purposes of financial transactions.

Financial card circuits 1804 interact with stripe 1802 to produce time-varying magnetic fields compatible with a magnetic card reader. For example, financial card circuits 1804 and stripe 1802 may provide financial transaction data to a point-of-sale terminal. Financial transaction card 1800 also includes memory card emulation circuitry 1806 to emulate the operation of a memory card. The combination of memory card emulation circuitry 1806 and memory card compatible interface 1808 allow financial transaction card 1800 to perform as a memory card. For example, memory card compatible interface 1808 may be compatible with a memory card interface in an add-on slot of an intelligent electronic device.

Figure 19:
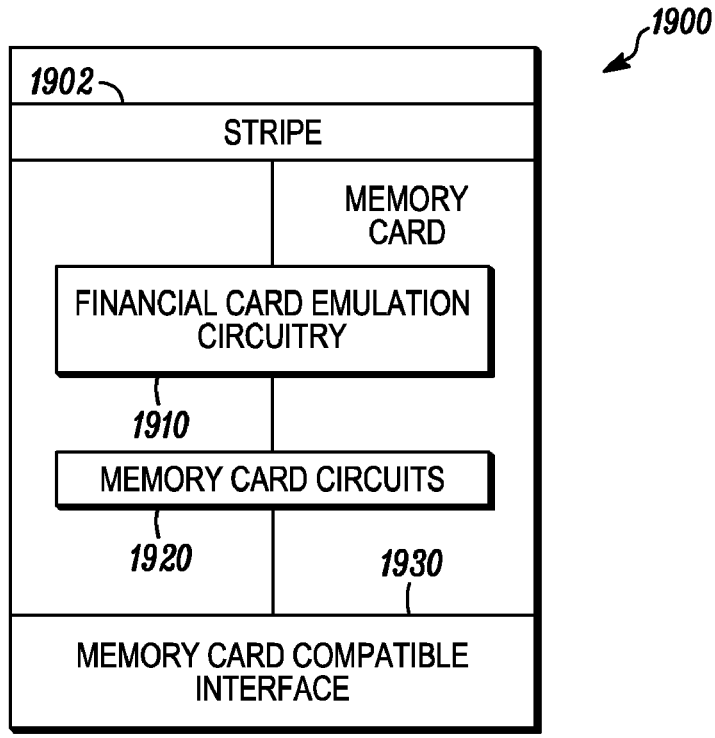
FIG. 19 shows a memory card.

FIG. 19 shows a memory card. Memory card 1900 includes memory card compatible interface 1930, memory card circuits 1920, financial card emulation circuitry 1910, and stripe 1902. Memory card 1900 is an example of a card that may be fabricated and sold by a memory card manufacturer or a manufacturer that is in the business of selling electronic peripheral devices. By including financial card emulation circuitry 1910 and stripe 1902 in memory card 1900, the manufacturer of memory card 1900 may add features desired by consumers. For example, the combination of stripe 1902 and financial card emulation circuitry 1910 may emulate the operation of a financial card such as a credit card, debit card, stored value card, or the like.

Figure 20:
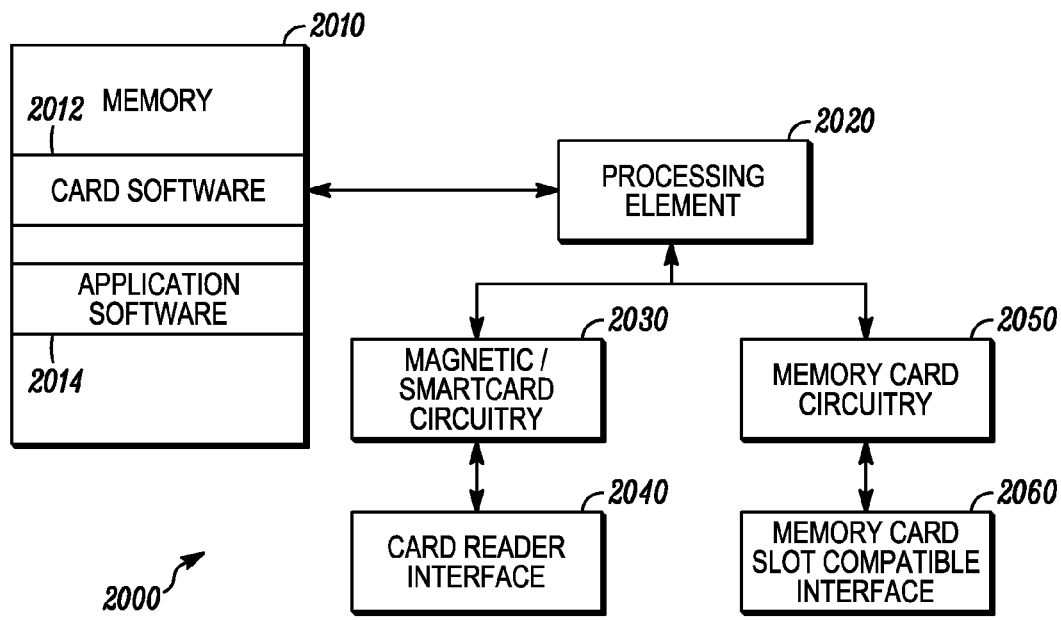
FIG. 20 shows a block diagram of a combination memory card and electronic transaction card.

FIG. 20 shows a block diagram of a combination memory card and electronic transaction card. Card 2000 includes memory 2010, processing element 2020, magnetic/smartcard circuitry 2030, card reader interface 2040, memory card circuitry 2050, and memory card slot compatible interface 2060. Processing element 2020 may be any processing element suitable to communicate with memory 2010 and the other blocks shown in FIG. 20. Magnetic/smartcard circuitry 2030 may include circuits to produce time-varying magnetic fields or signals compatible with a smart card reader. Card reader interface 2040 may include a stripe as described above, or may include electrical contacts compatible with a smartcard reader. Memory card circuitry 2050 may be any type of memory circuitry accessible by an intelligent electronic device. The intelligent electronic device may access memory card circuitry 2050 through memory card slot compatible interface 2060.

Memory 2010 is shown having card software 2012 and application software 2014. In some embodiments, card 2000 is sold or distributed having both card software 2012 and application software 2014 in memory 2010. For example, memory 2010 may be nonvolatile memory having card software 2012 for execution by processing element 2020. Also for example, memory 2010 may have application software 2014 meant to be installed on a device other than card 2000. Application software 2014 may include drivers, user interface software, single transaction account number (STAN) generation software, or any other software that may be installed on a device other than card 2000.

Application software 2014 may operate in any of multiple languages on multiple operating systems. For example, application software 2014 may provide a user interface in any regional language. Also for example, application software 2014 may run on any operating system (OS).

Figure 21:
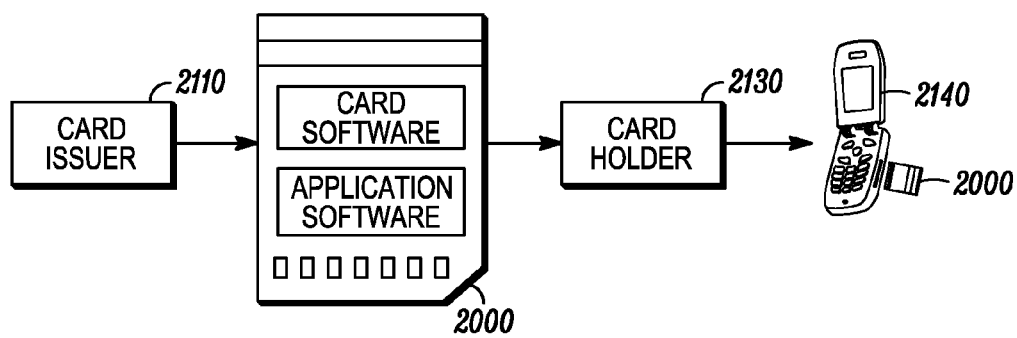
FIG. 21 shows a diagram of how a card may be utilized.

FIG. 21 shows a block diagram of how card 2000 (FIG. 20) may be utilized. A card issuer 2110 may issue card 2000 to a cardholder 2130. As issued by card issuer 2110, card 2000 may include card software and application software as shown in FIG. 21. Cardholder 2130 may couple card 2000 with intelligent electronic device 2140 and install application software on the intelligent electronic device. For example, intelligent electronic device 2140 may be a mobile phone capable of executing application software, and card 2000 may supply application software to be installed on the mobile phone. Also for example, intelligent electronic device 2140 may be a non-telephonic device such as a personal digital assistant (PDA), or other dedicated hardware, capable of receiving card 2000 in an add-on slot.

Figure 22:
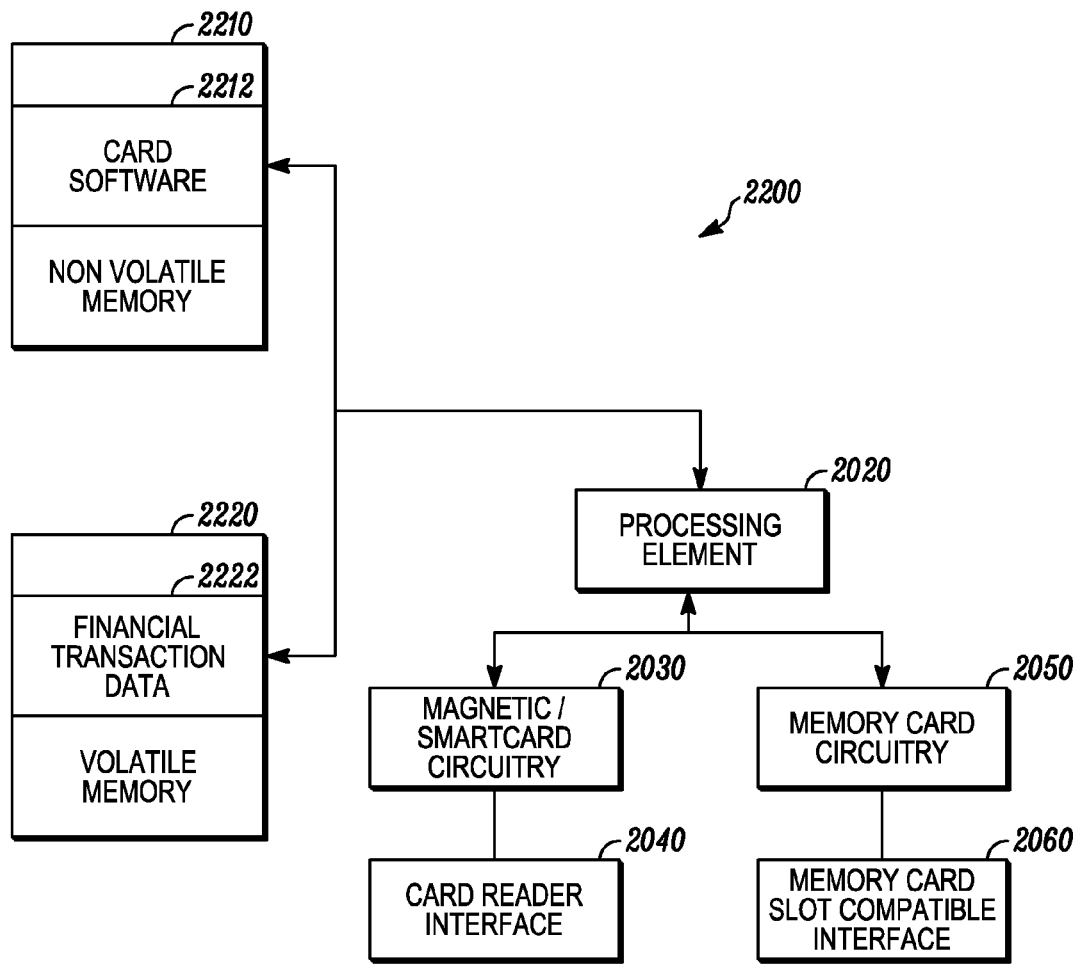
FIG. 22 shows a block diagram of a combination memory card and electronic transaction card.

FIG. 22 shows a block diagram of a combination memory card and electronic transaction card. Card 2200 includes processing element 2020, magnetic/smartcard circuitry 2030, card reader interface 2040, memory card circuitry 2050, and memory card slot compatible interface 2060, all of which are described above with reference to FIG. 20. Card 2200 also includes nonvolatile memory 2210 and volatile memory 2220. As shown in FIG. 22, nonvolatile memory 2210 includes card software 2212 to be executed by processing element 2020. Also as shown in FIG. 22, card 2200 includes volatile memory 2220 having financial transaction data 2222 held therein. Financial transaction data 2222 may be programmed into volatile memory 2220 by processing alignment 2020 in response to communications from an intelligent electronic device coupled to memory card slot compatible interface 2060. For example, a mobile phone executing single transaction account number generation software may provide a single transaction account number as financial transaction data that gets stored in volatile memory 2220 in preparation for a transaction. In other embodiments, financial transaction data 2222 represents two, three, four, or more time-varying magnetic fields to be generated by the combination of magnetic/smartcard circuitry 2030 and card reader interface 2040.

Figure 23:
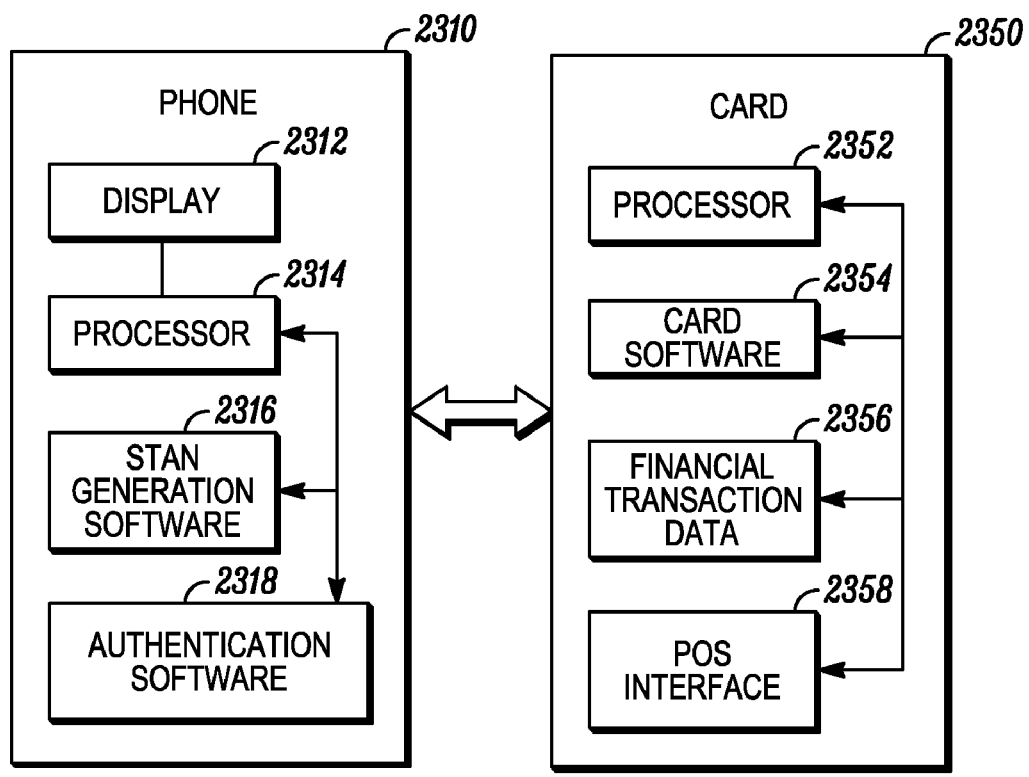
FIG. 23 shows a block diagram of a phone and a card.

FIG. 23 shows a block diagram of a phone and a card. Phone 2310 may be a cellular telephone, and card 2350 may be any of the electronic transaction card embodiments described herein. Phone 2310 includes display 2312, processor 2314, single transaction account number (STAN) generation software 2316, and authentication software 2318. Card 2350 includes processor 2352, card software 2354, financial transaction data 2356, and point-of-sale (POS) interface 2358.

Single transaction account number generation software 2316 may be installed on the phone 2310 when card 2350 is inserted in a memory slot. For example, referring now back to FIGS. 20 and 21, STAN generation software 2316 may correspond to application software 2014. Authentication software 2318 may only allow authorized users access to phone 2310 and/or card 2350.

In operation, a user interacting with phone 2310 may gain access to features by satisfying requirements of authentication software 2318. Using STAN generation software 2316, a user may generate financial transaction data 2356 which is held on card 2350 in preparation for a transaction. Card 2350 may then interact with a card reader using point-of-sale interface 2358 to effect a transaction. This transaction may be effected with card 2350 coupled to phone 2310 or decoupled from phone 2310. Further, the transaction using card 2350 may be effected while card 2350 is coupled to any of the adapter embodiments described herein.

The following paragraphs provide further disclosure of various invention embodiments. Each embodiment is fully defined by the recitation of the corresponding paragraph, and no other elements are to be considered essential for that particular embodiment. The embodiments include:

A. An apparatus comprising:
   a stripe to communicate with a magnetic card reader; and
   an interface to communicate with an intelligent electronic device;
   wherein the apparatus has dimensions smaller than a credit card.

A1. The apparatus of A wherein the stripe includes circuitry to produce at least one time-varying magnetic field.

A2. The apparatus of A wherein the interface is compatible with an add-on slot in the intelligent electronic device.

A3. The apparatus of A2 wherein the interface comprises a memory card interface.

A4. The apparatus of A further comprising a processing element coupled to the interface and to the stripe.

A5. The apparatus of A4 further comprising a memory element to hold programming information for the stripe.

A6. The apparatus of A4 further comprising an embedded swipe sensor to sense when the stripe is swiped through a magnetic card reader.

A7. The apparatus of A further comprising nonvolatile memory accessible by the intelligent electronic device.

B. A financial card comprising:
   a point-of-sale compatible electronic transaction stripe;
   a memory card compatible interface; and
   memory card emulation circuitry coupled to the memory card compatible interface.

C. A memory card comprising:
   a memory card compatible interface;
   a point-of-sale compatible electronic transaction stripe; and financial card emulation circuitry coupled to the point-of-sale compatible electronic transaction stripe.

D. A financial card apparatus comprising:
a point-of-sale compatible portion having a stripe to communicate with a point-of-sale transaction device; and
a memory card compatible portion having at least one electrical contact to communicate with a memory card slot in an intelligent electronic device.

E. A memory card comprising:
a memory card interface operable to couple the memory card to an intelligent electronic device;
a nonvolatile memory device accessible through the memory card interface; and
a stripe operable to communicate with a magnetic card reader.

F. A memory card comprising:
a memory card slot interface; and
circuitry for producing a time-varying magnetic field compatible with a magnetic card reader.

F1. The memory card of F wherein the circuitry is configured to produce a plurality of time-varying magnetic fields compatible with a point-of-sale transaction device.

G. An apparatus comprising:
means for communicating through a memory card slot in an intelligent electronic device;
means for producing at least one time-varying magnetic field to represent financial transaction data; and
means for storing the financial transaction data.

H. A card comprising:
a memory card compatible interface;
a smartcard compatible interface; and
a stripe to produce at least one time-varying magnetic field compatible with a magnetic card reader.

I. A memory card compatible with a memory card slot in a mobile phone, the memory card including nonvolatile memory accessible by the mobile phone, a point-of-sale interface to communicate with a point-of-sale terminal, and volatile memory to hold financial transaction data.

I1. The memory card of I wherein the point-of-sale interface comprises circuitry to produce at least one time-varying magnetic field.

I2. The memory card of I1 further including a processing device coupled to the nonvolatile memory, volatile memory, and point-of-sale interface.

J. An electronic financial transaction device having a thickness compatible with a point-of-sale card reader, a width less than a credit card width, a length less than a credit card length, an electronically programmable stripe situated along the length, and at least one electrical contact to provide an interface to an intelligent electronic device.

J1. The electronic financial transaction device of J wherein the at least one electrical contact comprises a memory card interface compatible with a memory card slot in the intelligent electronic device.

J2. The electronic financial transaction device of J wherein the electronically programmable stripe includes a circuit to emulate a magnetic stripe in a credit card.

J3. The electronic financial transaction device of J2 further comprising a swipe sensor to detect when the electronic financial device is swiped through a point-of-sale terminal.

K. A card comprising:
means for storing financial transaction data;
means for communicating with a memory card slot in an intelligent electronic device; and
means for creating a time-varying magnetic field that represents the financial transaction data.

K1. The card of K wherein the means for storing financial transaction data comprises volatile memory.

K2. The card of K wherein the financial transaction data comprises a single transaction account number.

K3. The card of K further comprising a processing device coupled to read the financial transaction data and influence the operation of the means for creating a time-varying magnetic field.

L. An adapter for use with any of A-K, the adapter comprising:
a body portion having exterior dimensions larger than dimensions of A-G; and
a receiving portion to receive any of A-G, wherein the receiving portion is located on the body portion to expose any of A-G for use in magnetic card reader transactions.

M. An apparatus comprising a body portion with dimensions compatible with a swallow-type magnetic card reader, wherein the body portion includes a memory card compatible area to receive a memory card with magnetic stripe functionality.

M1. The apparatus of M further comprising a smartcard interface.

M2. The apparatus of M further comprising at least one electrical component coupled to the memory card compatible area portion to interface to the memory card.

M3. The apparatus of M wherein the memory card compatible area comprises a recessed portion of at least one side of the apparatus.

M4. The apparatus of M wherein memory card compatible area comprises at least one metallic contact on a periphery of an aperture in the apparatus.

N. A financial card to be used with a magnetic card reader at a point-of-sale, the financial card including a memory card interface to allow the financial card to be inserted in a memory card slot of a mobile phone, and including a stripe compatible with the magnetic card reader, wherein the stripe is shorter than a magnetic credit card stripe.

O. A card compatible with a magnetic card reader and compatible with a memory slot in an intelligent electronic device, the card including software to be installed on the intelligent electronic device.

O1. The card of O wherein the software includes a module for single transaction account number generation.

O2. The card of O1 wherein the software is configured to run on a mobile phone.

O3. The card of O wherein the card comprises:
a memory slot compatible portion; and
a magnetic card reader compatible portion.

O4. The card of O3 wherein the magnetic card reader compatible portion comprises circuitry to produce at least one time-varying magnetic field for use in a financial transaction.

P. A card comprising:
a memory card interface mechanically compatible with a memory card slot in an intelligent electronic device;
a processing device coupled to the memory card interface; and
circuitry to produce a time-varying magnetic field compatible with a point-of-sale device.

Q. A card comprising:
a memory card interface electrically compatible with a memory card slot in an intelligent electronic device;
a processing device coupled to the memory card interface; and
circuitry to produce a time-varying magnetic field compatible with a point-of-sale device.

Q1. Any of the cards of P-Q further comprising nonvolatile memory exposed through the memory card interface.

Q2. Any of the cards of P-Q further comprising volatile memory to hold financial transaction information.

Q3. Any of the cards of P-Q further comprising a software component that when executed by the processing device causes the circuitry to produce at least one time-varying magnetic field representing the financial transaction information.

Q4. Any of the cards of P-Q further comprising a visible stripe at which the at least one time-varying magnetic field emanates.

Q5. Any of the cards of P-Q further comprising a battery.

Q6. Any of the cards of P-Q further comprising a capacitor to provide power to the card.

Q7. The card of Q wherein the card has a size substantially equivalent to a credit card.

R. A credit card sized adapter to receive any of the cards of P-Q.

R1. The adapter of R wherein the credit card sized adapter includes a smartcard interface.

R2. The adapter of R wherein the adapter includes a first edge having a width and a second edge having a length, wherein the second edge includes a recessed portion to accept the card.

R3. The adapter of R wherein the credit card sized adapter includes a first edge having a width and a second edge having a length, wherein the first edge includes a recessed portion to accept the card.

S. A combination financial card and memory card apparatus comprising:
electrical contacts to provide an interface to a mobile phone;
a transaction stripe to produce at least one time-varying magnetic field representing transaction information;
a processing device; and
a software component to receive the transaction information from the mobile phone;
wherein the electrical contacts are provided on a physical portion of the combination financial card and memory card apparatus having dimensions compatible with a memory card slot.

S1. The combination financial card and memory card apparatus of S further comprises an application software component to be installed on the mobile phone.

T. In combination:
a memory card having a transaction stripe compatible with a magnetic card reader; and
a credit card sized adapter to receive the memory card and to expose the transaction stripe for use in magnetic card reader transactions.

U. In combination:
a memory card having an interface compatible with a memory card slot in a mobile phone and a smartcard interface; and
a credit card sized adapter to receive the memory card and to expose the smartcard interface for use in smartcard transactions.

V. A financial transaction system comprising:
a mobile phone having a memory card slot;
a memory card compatible with the memory card slot, wherein the memory card includes circuitry to transmit financial transaction data to a point-of-sale device; and
a software component to produce single transaction account numbers for use as financial transaction data.

W. A system comprising:
a wearable intelligent electronic device having a card slot; and
a card comprising a card slot interface and circuitry for producing a time-varying magnetic field compatible with a magnetic card reader.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. An apparatus with a compatible interface in a mobile phone, the apparatus including smartcard circuitry accessible by the mobile phone, the smartcard circuitry including a point-of-sale interface to communicate with a point-of-sale terminal, wherein the point-of-sale interface receives power from the mobile phone.

2. The apparatus of claim 1 wherein the point-of-sale interface comprises circuitry to produce at least one time-varying magnetic field.

3. The apparatus of claim 2 further comprising memory accessible by the mobile phone.

4. The apparatus of claim 1 wherein the point-of-sale interface includes circuitry compatible with a hybrid smartcard reader.

5. The apparatus of claim 1 further comprising memory accessible by the mobile phone.

6. The apparatus of claim 1 further including software to be installed on the mobile phone.

7. An apparatus for performing a financial transaction comprising:
means for communicating through a compatible interface in an intelligent electronic device;
means for producing at least one time-varying magnetic field to represent financial transaction data, wherein the means for producing receives power from the intelligent electronic device; and
means for storing the financial transaction data.

8. The apparatus of claim 7 further including software to be installed on the intelligent electronic device.

9. The apparatus of claim 8 wherein the software is configured to run on a mobile phone.

10. The apparatus of claim 7 further comprising nonvolatile memory accessible through the means for communicating through a compatible interface.

11. The apparatus of claim 7 wherein the means for producing at least one time-varying magnetic field includes circuitry compatible with a hybrid smartcard reader.

12. The apparatus of claim 7 wherein the means for producing at least one time-varying magnetic field includes smartcard circuitry.

13. The apparatus of claim 7 wherein the means for communicating through a compatible interface comprises a capacitor to be charged and to power the means for producing at least one time-varying magnetic field.

14. An apparatus comprising:
first interface compatible with a second interface in a mobile phone; and
circuitry powered by the first interface for producing a signal compatible with a card reader.

15. The apparatus of claim 14 further comprising nonvolatile memory accessible via the first interface.

16. The apparatus of claim 14 wherein the circuitry for producing a signal compatible with a card reader includes circuitry compatible with a hybrid smartcard reader.

17. The apparatus of claim 14 wherein the circuitry for producing a signal compatible with a card reader includes smartcard circuitry.

18. The apparatus of claim 14 further comprising software to be transferred to a device other than the apparatus.

19. The apparatus of claim 14 further comprising a capacitor to be charged by the first interface and to supply power to the apparatus.

20. The apparatus of claim 14 further comprising a battery to be charged by the first interface and to supply power to the apparatus.

* * * * *